Patented Oct. 5, 1948

2,450,640

UNITED STATES PATENT OFFICE 2,450,640

PRODUCTION OF NITRILES

William I. Denton, Woodbury, and Richard B. Bishop, Haddonfield, N. J., assignors to Socony-Vacuum Oil Company, Incorporated, a corporation of New York No Drawing. Application March 9, 1946, Serial No. 653,435

9 Claims. (Cl. 260—465)

This invention relates to a process for producing nitriles having at least two carbon atoms, and is more particularly concerned with a catalytic process for producing nitriles having at least two carbon atoms, from cycloparaffinic hydrocarbons.

Nitriles are organic compounds containing combined nitrogen. Their formula may be represented thus: R—C≡N, in which R is an alkyl or an aryl group. These compounds are very useful since they can be converted readily to many valuable products such as acids, amines, aldehydes, esters, etc.

As is well known to those familiar with the art, several processes have been proposed for the preparation of nitriles. In general, however, all of these processes have been disadvantageous from one or more standpoints, namely, the relatively high cost of the reactants employed and/or the toxic nature of some of the reactants and/or the number of operations involved in their ultimate preparation. For example, aliphatic nitriles have been synthesized by oxidizing hydrocarbons to acids followed by reacting the acids thus obtained with ammonia in the presence of silica gel. Other methods involve reacting alkyl halides with alkali cyanides, reacting ketones with hydrogen cyanide in the presence of dehydration catalysts, etc. Aromatic nitriles have been synthesized by reacting alkali cyanides with aromatic sulfonates or with aromatic-substituted alkyl halides; by reacting more complex cyanides such as potassium cuprous cyanide, with diazonium halides; by reacting isothiocyanates with copper or with zinc dust; and by reacting aryl aldoximes with acyl halides.

We have now found a process for producing nitriles which is simple and inexpensive, and which employs non-toxic reactants.

We have discovered that nitriles containing at least two carbon atoms, can be prepared by reacting cycloparaffinic hydrocarbons with ammonia, at elevated temperatures, in the presence of catalytic material containing vanadium oxide.

Our invention is to be distinguished from the conventional processes for the production of hydrogen cyanide wherein carbon compounds, such as carbon monoxide, methane, and benzene, are reacted with ammonia at elevated temperatures in the presence of alumina, nickel, quartz, clays, oxides of thorium and cerium, copper, iron oxide, silver, iron, cobalt, chromium, aluminum phosphate, etc. The process of the present invention is also to be distinguished from the processes of the prior art for the production of amines wherein hydrocarbons are reacted with ammonia at high temperatures, or at lower temperatures in the presence of nickel.

Accordingly, it is an object of the present invention to provide a process for the production of nitriles containing at least two carbon atoms. Another object is to afford a catalytic process for the production of nitriles containing at least two carbon atoms. An important object is to provide a process for producing nitriles containing at least two carbon atoms which is inexpensive and commercially feasible. A specific object is to provide a process for producing nitriles containing at least two carbon atoms, from cycloparaffinic hydrocarbons. Other objects and advantages of the present invention will become apparent to those skilled in the art from the following description.

Broadly stated, our invention provides an inexpensive and commercially feasible process for the production of nitriles containing at least two carbon atoms, which comprises reacting certain cycloparaffinic hydrocarbons with ammonia, in the gaseous phase and at elevated temperatures, in the presence of catalytic material containing a vanadium oxide.

The cycloparaffinic hydrocarbons which are suitable as the hydrocarbon reactant in the process of our invention are cyclopropane, cyclobutane; cyclopentane; and the alkyl-substituted cyclopropanes, cyclobutanes and cyclopentanes; the alkyl-substituted cyclohexanes; and the alkyl-substituted decalins. Of the alkyl-substituted cycloparaffinic hydrocarbons, we prefer to use the methyl-substituted cycloparaffinic hydrocarbons, and of these, dimethyl cyclohexane, methyl cyclohexane and methyl decalin are especially preferred. It will be clear from the discussion of reaction temperatures set forth hereinafter, that many of the aforementioned cycloparaffinic hydrocarbons are not present per se when in contact with ammonia and a catalyst of the type used herein, for many of them are cracked to related hydrocarbons under such conditions. Nevertheless, all the aforementioned cycloparaffinic hydrocarbons and their hydrocarbon decomposition products, which are in the vapor phase under the herein-defined reaction conditions serve the purpose of the present invention. It is to be understood also, that hydrocarbon mixtures containing one or more of the aforementioned cycloparaffinic hydrocarbons may also be used herein, and that when such mixtures are used, the reaction conditions, such as contact time, will be slightly different in view of the dilution effect of the constituents present with the said cycloparaffinic hydrocarbon or hydrocarbons. Accordingly, any of the aforementioned cycloparaffinic hydrocarbons, mixtures thereof, and hydrocarbon mixtures containing one or more of said cycloparaffinic hydrocarbons may be used.

The proportions of reactants, i.e., cycloparaffinic hydrocarbon and ammonia, used in our process may be varied over a wide range with little effect on the conversion per pass and ultimate yield. In general, the charge of reactants may contain as little as 2 mol. % or as much as 98 mol. % of cycloparaffinic hydrocarbons. In practice, however, we use charges containing between about 20 mol. % and about 90 mol. % of cycloparaffinic hydrocarbon, and ordinarily, we prefer to use charges containing a molar excess of ammonia over the cycloparaffinic hydrocarbon reactant.

We have found that the catalysts to be used to produce nitriles containing at least two carbon atoms, by reacting the aforementioned cycloparaffinic hydrocarbons with ammonia, are those containing a vanadium oxide, such as vanadium monoxide (VO), vanadium trioxide ($V_2O_3$), vanadium dioxide ($VO_2$) and vanadium pentoxide ($V_2O_5$). Therefore, and in the interest of brevity, it must be clearly understood that when we speak of vanadium oxide, herein and in the claims, we have reference to the various oxides of vanadium. We have found, however, that vanadium pentoxide is to be preferred as a starting catalytic material.

While vanadium oxide catalysts are effective when used per se, they generally possess additional catalytic activity when used in conjunction with the well known catalyst supports, such as alumina, silica gel, carborundum, pumice, clays, and the like. We especially prefer to use alumina ($Al_2O_3$) as a catalyst support, and we have found that a catalyst comprising vanadium pentoxide supported on alumina is particularly useful for our purpose. Without any intent of limiting the scope of the present invention, it is suspected that the enhanced catalytic activity of the supported catalysts is attributable primarily to their relatively large surface area.

The concentration of catalytic metal oxide in the supported catalysts influences the conversion per pass. In general, the conversion per pass increases with increase in the concentration of vanadium oxide. For example, we have found that a catalyst comprising 20 parts by weight of vanadium pentoxide on 80 parts by weight of alumina is more effective than one comprising 10 parts by weight of vanadium pentoxide on 90 parts by weight of alumina. It is to be understood, however, that supported catalysts containing larger or smaller amounts of vanadium oxide may be used in our process.

We have found also that in order to obtain initial maximum catalytic efficiency, particularly where the catalytic material comprises the higher oxides of vanadium, that the catalysts should be conditioned prior to use in the process. As defined herein conditioned catalysts are those which have been exposed to ammonia or hydrogen, or both, for a period of time, several minutes to several hours, depending upon the quantity, at temperatures varying between about 800° F. and about 1300° F. However, if desired, the conditioning treatment may be dispensed with inasmuch as the catalyst becomes conditioned during the initial stages of our process when the catalyst comes in contact with the ammonia reactant.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated, as is well known in the art, by subjecting the same to a careful oxidation treatment, for example, by passing a stream of air or air diluted with flue gases over the catalyst under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and one minute and more, particularly, contact times varying between 0.3 second and 30 seconds.

In general, the temperatures to be used in our process vary between about 925° F. and up to the decomposition temperature of ammonia (about 1250–1300° F.), and preferably, temperatures varying between about 975° F. and about 1100° F. The preferred temperature to be used in any particular operation will depend upon the nature of cycloparaffinic hydrocarbon reactant used and upon the type of catalyst employed. Generally speaking, the higher temperatures increase the conversion per pass but they also increase the decomposition of the reactants thereby decreasing the ultimate yields of nitriles. Accordingly, the criteria for determining the optimum temperature to be used in any particular operation will be based on the nature of the cycloparaffinic hydrocarbon reactant, the type of catalyst, and a consideration of commercial feasibility from the standpoint of striking a practical balance between conversion per pass and losses to decomposition.

The process of the present invention may be carried out at subatmospheric, atmospheric, or superatmospheric pressures. Superatmospheric pressures are advantageous in that the unreacted charge materials condense more readily. Subatmospheric pressures appear to favor the reactions involved since the reaction products have a larger volume than the reactants, and hence, it is evident from the law of Le Chatelier-Braun that the equilibrium favors nitrile formation more at reduced pressures. However, such pressures reduce the throughput of the reactants and present increased difficulties in recycling unreacted charge materials. Therefore, atmospheric pressure or superatmospheric pressures are preferred.

At the present time, the reaction mechanism involved in the process of the present invention is not fully understood. Fundamentally, the simplest possible method of making nitriles is to introduce nitrogen directly into the hydrocarbon reactant molecule, thereby avoiding intermediate steps with their accompanying increased cost. It our process, we have noted that considerable amounts of hydrogen are evolved and that aliphatic nitriles as well as aromatic nitriles are formed. Hence, it is postulated without any intent of limiting the scope of the present invention, that in our process, the aliphatic nitriles are formed by an initial ring opening followed by replacement of hydrogen with nitrogen, while the aromatic nitriles are formed by the dehydrogenation of a cycloparaffinic hydrocarbon reactant to form an aromatic hydrocarbon, followed by introduction of the nitrogen.

The present process may be carried out by making use of any of the well-known techniques for operating catalytic reactions in the vapor phase effectively. By way of illustration, methyl cyclohexane and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration, etc. The reaction mixture will be predominantly a mixture of nitriles, hydrogen, toluene, unchanged methyl cyclohexane, and unchanged ammonia. The nitriles, the unchanged methyl cyclohexane, and toluene will be condensed in passing through the condensing zone and will be retained in the receiving chamber. The nitriles can be separated from the unchanged methyl cyclohexane and toluene by any of the numerous and well known separation procedures, such as fractional distillation. Similarly, the uncondensed hydrogen and unchanged ammonia can be separated from each other. The unchanged methyl cyclohexane and ammonia, and toluene, if desired, can be recycled, with or without fresh methyl cyclohexane and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place, in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed examples are for the purpose of illustrating modes of preparing nitriles in accordance with the process of our invention, it being clearly understood that the invention is not to be considered as limited to the specific cycloparaffinic hydrocarbon reactants and catalyst disclosed therein or to the manipulations and conditions set forth in the example. As it will be apparent to those skilled in the art, a wide variety of other cycloparaffinic hydrocarbons and of other catalysts of the type described hereinbefore may be used.

A reactor consisting of a shell containing a catalyst chamber heated by circulating a heat-transfer medium thereover, and containing 100 parts by weight of catalyst comprising 10 parts by weight of vanadium pentoxide supported on 90 parts by weight of activated alumina was used. The catalyst was prepared by soaking commercial activated alumina in an aqueous solution of ammonium vanadate followed by heating of the thus treated alumina to drive off water. The catalyst was conditioned by passing a stream of ammonia thereover for 45 minutes at 900° F. Ammonia and various types of cycloparaffinic hydrocarbons, in a molar ratio of 2:1, respectively, were introduced in the vapor phase into the reactor. The reaction mixture was passed from the reactor, through a condenser, into a first receiving chamber. Hydrogen and unchanged ammonia were collected in a second receiving chamber and then separated from each other. The nitriles and the unchanged cycloparaffinic hydrocarbon reactants (some of the latter were converted to aromatic hydrocarbons) remained in the first receiving chamber and were subsequently separated by distillation. The pertinent data and the results of each run are tabulated in the following table:

| Example No. | Cycloparaffinic Hydrocarbon Reactant | Temperature in °F. | Contact Time in Seconds | Conversion Per Pass, Per Cent Weight of Hydrocarbon Charged | Nitriles Formed |
| --- | --- | --- | --- | --- | --- |
| 1 | Methyl Cyclopentane | 1,050 | 2.5 | 1.0<br>0.5 | Acetonitrile.<br>Aromatic nitriles. |
| 2 | Dimethyl Cyclohexane | 1,050 | 5.0 | 1.4<br>0.5 | Tolunitrile.<br>Acetonitrile. |

It will be apparent that the present invention provides an efficient, inexpensive and safe process for obtaining nitriles. Our process is of considerable value in making available relatively inexpensive nitriles which are useful, for example, as intermediates in organic synthesis.

This application is a continuation-in-part of copending application, Serial Number 553,291, filed September 8, 1944, now abandoned.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. A process for the production of nitriles having at least two carbon atoms per molecule, which comprises contacting a cycloparaffinic hydrocarbon selected from the group consisting of dimethyl cyclohexane, methyl cyclohexane, methyl cyclopentane, and methyl decalin, with ammonia, in gaseous phase, at temperatures falling within the range varying between about 925° F. and about 1075° F., in the presence of a catalyst comprising a vanadium oxide.

2. A process for the production of nitriles having at least two carbon atoms per molecule, which comprises contacting a cycloparaffinic hydrocarbon selected from the group consisting of dimethyl cyclohexane, methyl cyclohexane, methyl cyclopentane, and methyl decalin, with ammonia, in gaseous phase, at temperatures falling within the range varying between about 925° F. and about 1075° F., in the presence of a vanadium oxide supported on a catalyst support.

3. A process for the production of nitriles having at least two carbon atoms per molecule, which comprises contacting a cycloparaffinic hydrocarbon selected from the group consisting of dimethyl cyclohexane, methyl cyclohexane, methyl cyclopentane, and methyl decalin, with ammonia, in gaseous phase, at temperatures falling within the range varying between about 925° F. and about 1075° F., in the presence of vanadium pentoxide supported on alumina.

4. A process for the production of nitriles having at least two carbon atoms per molecule, which comprises contacting dimethyl cyclohexane with ammonia, in gaseous phase, at temperatures falling within the range varying between about 925° F. and about 1075° F., in the presence of a catalyst comprising a vanadium oxide.

5. A process for the production of nitriles having at least two carbon atoms per molecule, which comprises contacting dimethyl cyclohexane with ammonia, in gaseous phase, at temperatures falling within the range varying between about 925° F. and about 1075° F., in the presence of a vanadium oxide supported on a catalyst support.

6. A process for the production of nitriles having at least two carbon atoms per molecule, which comprises contacting dimethyl cyclohexane with ammonia, in gaseous phase, at temperatures falling within the range varying between about 925° F. and about 1075° F., in the presence of vanadium pentoxide supported on alumina.

7. A process for the production of nitriles having at least two carbon atoms per molecule, which comprises contacting methyl cyclopentane with ammonia, in gaseous phase, at temperatures falling within the range varying between about 925° F. and about 1075° F., in the presence of a catalyst comprising a vanadium oxide.

8. A process for the production of nitriles having at least two carbon atoms per molecule, which comprises contacting methyl cyclopentane with ammonia, in gaseous phase, at temperatures falling within the range varying between about 925° F. and about 1075° F., in the presence of a vanadium oxide supported on a catalyst support.

9. A process for the production of nitriles having at least two carbon atoms per molecule, which comprises contacting methyl cyclopentane with ammonia, in gaseous phase, at temperatures falling within the range varying between about 925° F. and about 1075° F., in the presence of vanadium pentoxide supported on alumina.

WILLIAM I. DENTON.
RICHARD B. BISHOP.

REFERENCES CITED

The following references are of record in the file of this patent:

UNITED STATES PATENTS

| Number | Name | Date |
|---|---|---|
| 1,318,633 | Weiss | Oct. 14, 1919 |
| 1,920,795 | Jaeger | Aug. 1, 1933 |
| 1,934,838 | Andrussow | Nov. 14, 1933 |
| 2,331,968 | Forney | Oct. 19, 1943 |
| 2,381,470 | Teter | Aug. 7, 1945 |
| 2,381,471 | Teter | Aug. 7, 1945 |
| 2,381,472 | Teter | Aug. 7, 1945 |
| 2,381,473 | Teter | Aug. 7, 1945 |
| 2,381,709 | Apgar, et al | Aug. 7, 1945 |